May 29, 1923.
J. S. ALSPAUGH
GEAR SHIFTING MECHANISM
Filed April 26, 1922
1,456,496
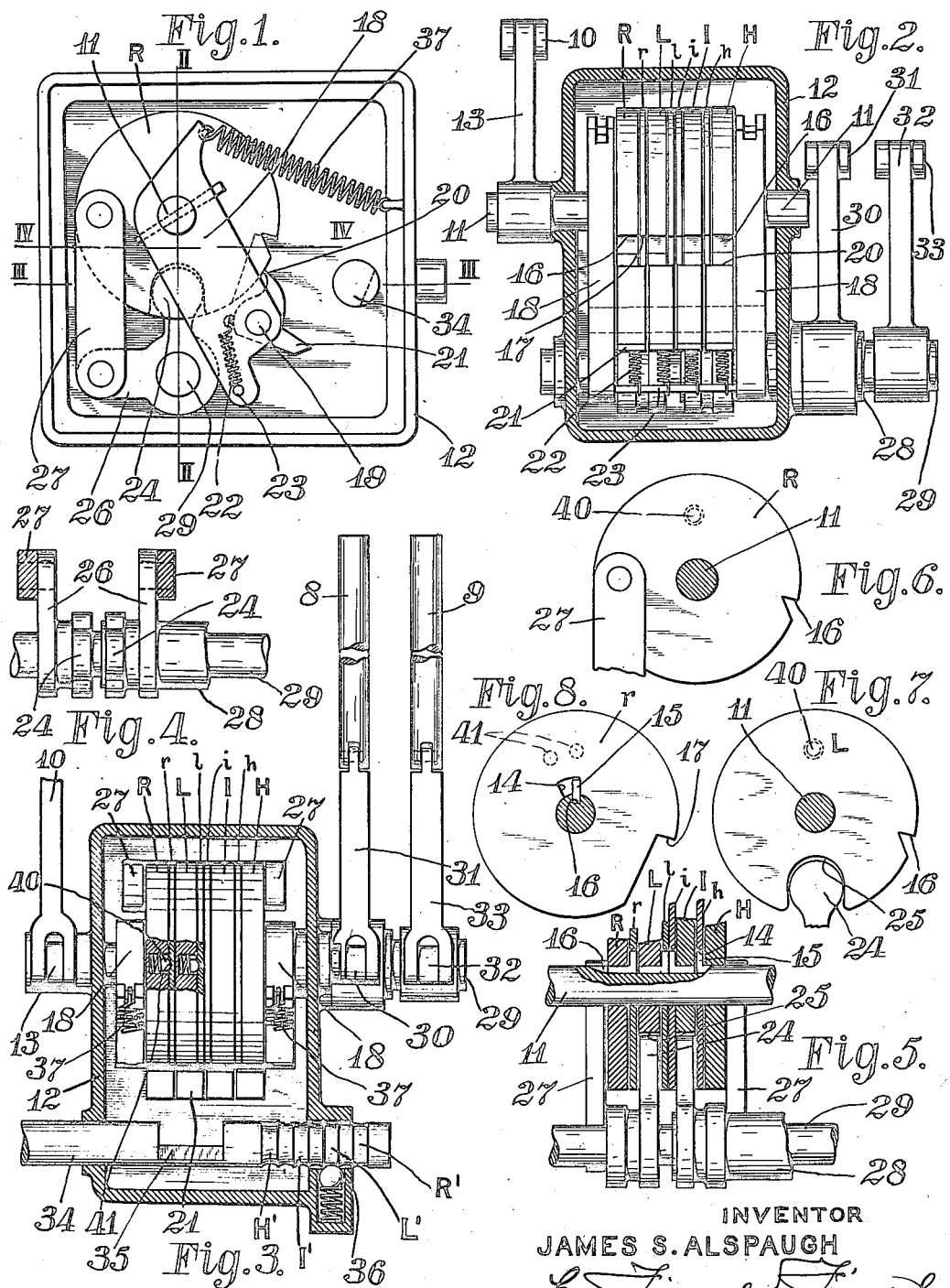
INVENTOR
JAMES S. ALSPAUGH
his ATTYS.

Patented May 29, 1923.

1,456,496

UNITED STATES PATENT OFFICE.

JAMES S. ALSPAUGH, OF PORTSMOUTH, OHIO.

GEAR-SHIFTING MECHANISM.

Application filed April 26, 1922. Serial No. 556,676.

*To all whom it may concern:*

Be it known that I, JAMES S. ALSPAUGH, a citizen of the United States, residing at Portsmouth, in the county of Scioto and State of Ohio, have invented a certain new and useful Improvement in Gear-Shifting Mechanisms, of which the following is a specification.

The present invention relates more particularly to a gear shift mechanism for a motor vehicle, such mechanism being of the sliding type such as used for example in the "Cadillac" and many other cars. In this sort of mechanism, as well understood, a hand lever is used to shift the gears into low, intermediate, high and reverse, such mechanism including two rods, one of which is shifted to obtain low and reverse, and the other shifted to obtain intermediate or high. In a United States patent issued to me January 31, 1922, No. 1,402,334 I show and describe a mechanism for dispensing with the use of a hand operated lever in such a mechanism. I also show a refinement of such a mechanism in an application for patent filed by me December 22, 1921, S. No. 524,117. The present invention is designed to be operated by the ordinary clutch lever and its associated spring or an equivalent thereof in conjunction with a selector device that may be manually operated if desired, at the steering wheel. The principal object of the present invention is to provide a simple, cheap and compact construction that can be applied to gear shift rods and clutch lever without extensive modification of either. Other objects and features of the invention will appear from the disclosure herein.

In the accompanying drawings illustrating one example of the invention—

Figure 1 is a view in elevation looking at the left hand end of the mechanism.

Fig. 2 is a front elevation of the same mechanism the housing being in section on the line II—II Fig. 1.

Fig. 3 is a top plan view partly in section of the mechanism the housing being in section on the line III—III Fig. 1.

Fig. 4 is a detail in horizontal section on the line IV—IV, looking down, to show the shafts for operating the gear shift rods and the bell crank levers and connected links that are actuated by the disks.

Fig. 5 is a detail partly in vertical section transversely of the disks showing said shafts, bell crank levers and links and their relation to the disks.

Fig. 6 is a side view of the link-carrying gear shift rod operating disk.

Fig. 7 is a similar view of its companion disk, said disk directly engaging an arm of the bell crank lever.

Fig. 8 is a side view of one of the thin or bridging disks they being all alike.

In the several views 9 designates the low and reverse gear shifting rod while 8 designates the second and high gear shifting rod. These rods are those commonly present in gear shifting mechanisms of the kind particularly referred to, said rods being modified in the present invention only for connection with their operating means as herein set forth. In the present construction these rods 9 and 8 are operated by a forward stroke of the usual clutch lever, a rod 10 being connected with the foot pedal arm of that lever at the proper point for that purpose.

11 designates a shaft journaled in a suitable housing 12 to which shaft the rod 10 is connected by a crank arm 13 so that upon pushing the clutch lever out with the foot said shaft is rocked in the forward direction and upon releasing said lever of pressure said shaft is rocked in a rearward direction due to the action of the usual clutch spring for engaging the clutch.

The shaft 11 has loose upon it two pairs of thick rod shifting disks suggestingly designated L, and R, and I and H. Each of said disks has a companion thin disk designated *l r i* and *h* respectively. These thin disks will be termed "bridging" disks or members. The bridging disks are each provided with a sector slot 14 into which projects a pin 15, said pin being conveniently, one arm of an L-shaped member the other arm being set in a square key way 16 in the shaft 11 to hold the pin in the fixed position as shown. The arm in the key way is conveniently located under and held from escape by the companion thick disk the thick disk rocking over it. A face of each thick disk is provided with a spring actuated latching ball 40 to engage either of two shallow sockets 41 in the companion bridging disk to yieldingly hold the bridging disk in the position to which shifted in relation to the thick disk. The gear shift rod operating disks R, L, I, H, are each made with a short notch to form a tooth 16 while each of the bridging disks is made with a long notch to form a tooth 17. In the neutral position of the two gear shift rods 9 and 8 the teeth of all the disks stand in the same horizontal line.

Secured to the shaft 11 at opposite sides of the grouped disks are the end members 18 of a frame for carrying pawls for actuating the respective disks said frame members having secured between them shaft 19 on which the pawls are pivoted. The said pawls are each formed with a beak 20 of such width as to engage the teeth 16 and 17 referred to and a tail 21 for the purpose hereinafter explained. The beaks of the pawls are each held normally toward the rim of the disks by means of coil springs 22 secured to the pawls and to a small rod 23 secured between the lower ends of the frame members 18.

The members of each of the two pairs of the thick disks are connected for reciprocal operation in contrary directions that is to say when one disk of a pair is moved forward the other disk is moved rearward by means of a bell crank lever having one arm 24 reaching into a radial slot 25 in one of the disks and its other arm 26 connected by means of a link 27 with the companion disk. The bell crank lever of the R and L disks is secured to a solid rock shaft 29 while the bell crank lever of the I and H disks is secured on a hollow rock shaft 28 telescoped on the solid shaft 29 both shafts being journaled in the housing 12. A crank arm 30 secured to the hollow shaft 28 is connected by means of a link 31 with the intermediate and high gear shift rod 8 while a crank arm 32 secured to the solid shaft 29 is connected by means of a link 33 with the low and reverse gear shift rod 9.

34 designates the selector bar or gate. This bar 34 is arranged to slide in the housing 12 in the path of movement of the tails 21 of the pawls, said bar, however, being provided with a notch 35 adapted to permit the passage upward of either one or two of the pawls for engagement with the teeth 16 and 17 of the disks to carry them forward beyond the neutral position according to the selected position of the notch 35. Contact of the tail 21 with the lower side of the bar is designed to withdraw the beak of the pawl from any tooth and leave the disk at neutral position. Said selector bar is provided at one end with a series of four annular grooves suggestively designated R', L', I' and H' and grooves intermediate them each of which is engageable by a spring actuated ball latch 36 to yieldingly hold the bar in position to which slid. The selector bar can be provided with any suitable means within convenient reach of the driver of the vehicle for shifting it back and forth into any of the positions provided by the annular notches. The selector bar can thus be shifted for selective operation to bring its notch 35 into position to permit the operation of any one of the pawls and the disk it is to operate when the clutch lever is pushed forward. When the notch 35 is moved to a position where the ball latch engages one of the intermediate annular notches it permits the passage of two pawls but the operation of one only of the thick disks for the reason to be hereinafter explained in connection with the description of automatic shifting as distinguished from selective shifting.

37, 37 designate springs connecting the pawl carrying frame 18 with the housing said springs merely supplementing the action of the usual clutch operating spring before referred to and not shown.

The selector bar as shown in Fig. 3 is set for actuating the "low" disk L and its companion bridging disk l. Upon pushing the clutch rod 10 all the pawls are raised but only the pawl for actuating the disks L and l passes through the notch 35 and therefore only the teeth of said disks L and l are engaged to rotate said disks. The rotation of the disk L forward shifts the rod 9 forward to secure low speed. It will be noted that this operation rotates the disk R rearward carrying its tooth below neutral position but being loose on the shaft 11 it rotates idly. It will also be noted that all the bridging disks are moved forward because connected (though with the indicated lost motion) with the shaft 11. Upon the retraction of the clutch rod 10 after said operation the disk L and the rod 9 are left where thus placed but the thin or bridging disks are all rotated rearward to neutral position thereby closing the opening at one side of the notch forming the tooth 16 in the advanced thick disk L and forming a bridge on which the pawl will ride upon a repetition of the stroke. It will be remembered that upon the first forward stroke as just described the thick disk R, because connected with the disk L, stands shifted rearward placing its tooth below the neutral position. Hence a second forward stroke of the clutch lever with the selector set for low as described will permit the proper pawl to engage the R or reverse disk and carry it to neutral position only because the tail of the pawl contacts with the lower side of the selector bar and disengages the beak of the pawl at that position. To go into reverse the selector bar 34 is shifted to the left two notches to permit the passage of the pawl with the beak engaged with the R disk to carry it beyond the neutral position. The operation is similar with the intermediate and high disks.

It is often desirable to shift back and forth past neutral between two gears as, for example, between high and intermediate when traveling through hilly or mountainous country, or between low and reverse when working for a position near a curb or when preparing to turn around in a narrow road. In such a case it is necessary that the selector bar be first moved to permit the shifting of one only of the rod shifting thick disks and then move the selector bar to the proper intermediate groove for latching it to permit the passage of both pawls for operating adjacent thick disks. When the desired thick disk is advanced by the passage and actuation of one only of the pawls the companion thick disk and its bridging disk are retrograded to position below neutral with the tooth 16 of the retrograded disk exposed for actuation. Upon the return movement of the pawls in this operation the bridging disk of the advanced thick disk is drawn rearward (by the pin 15) sufficiently to bridge the gap forming the tooth 16 of such advanced disk hence when such rearwardly placed thick disk is advanced the actuating pawl of that disk passes inertly over that tooth. When the second thick disk is advanced the first operated thick disk and its bridging disk are similarly retrograded to in rear of neutral and the operation repeated. This last described operation I term automatic.

In shifting from one gear to another and remote gear an advanced disk is restored to neutral because the pawl operating it picks up the companion of the advanced disk and restores that pair to neutral position.

The forms of the parts can be changed without departing from the gist of the invention as claimed. Although the so called disks may possess some advantages in manufacture and operation they are technically levers, fulcrumed on the shaft 11 and it is practicable to embody them in a great variety of forms.

What I claim is:

1. Means for reciprocating a gear shift rod comprising, in combination, a rock shaft and means for actuating said rod from said shaft, a pair of levers connected together and to said rock shaft to cause a back and forth motion of said rock shaft when said levers are alternately moved in the same direction, and means for imparting such movement to said levers.

2. In a motor vehicle having a foot lever and a gear shift mechanism including a gear shift rod, means for reciprocating said gear shift rod comprising, in combination, a rock shaft having means for engaging said gear shift rod, a pair of levers connected together and to said rock shaft to cause a back and forth motion of said rock shaft when said levers are alternately moved in the same direction, and means operated by the foot lever for imparting such movements to said levers.

3. In a motor vehicle having a foot lever and a gear shift rod, means for reciprocating said gear shift rod comprising, in combination, a rock shaft having means for engaging said gear shift rod, a pair of levers connected together and to said rock shaft to cause a back and forth motion of said shaft when said levers are alternately moved in the same direction and means operated by the foot lever for imparting such movements to said levers.

4. In a motor vehicle having a foot lever and a gear shift rod, means for reciprocating said gear shift rod comprising, in combination, a rock shaft having means for engaging said gear shift rod, a pair of levers connected together and to said rock shaft to cause a back and forth motion of said rock shaft when said levers are alternately moved in the same direction, means for preventing the successive operation of one of said levers by successive operations of the clutch lever and means operated by the foot lever for imparting such movements to said levers.

5. In a motor vehicle having a foot lever and a gear shift rod, means for reciprocating said gear shift rod comprising, in combination, a rock shaft having means for engaging said gear shift rod, a pair of levers connected together and to said rock shaft to cause a back and forth motion of said rock shaft when said levers are alternately moved in the same direction, means operated by the clutch lever for imparting such movements to said levers and a selector device to cause the shifting of said levers from shifted to neutral position by successive operations of the foot lever.

6. In a motor vehicle having a foot lever and a gear shift mechanism including two gear shift rods, means for reciprocating said rods comprising, in combination, two rock shafts, one having means for engaging one of said rods and the other having means for engaging the other of said rods, two pairs of levers the members of each pair being connected together and to the respective shafts to cause a back and forth motion of its shaft when the levers of the pair are alternately moved in the same direction, means operated by the foot lever for imparting such movements to said levers, and a selector device to cause the shifting of any one of said levers of either pair from shifted to neutral position by successive operations of the foot lever.

7. In a motor vehicle having a foot lever and a gear shift mechanism including two gear shift rods, means for reciprocating said rods comprising, in combination, two rock shafts, one having means for engaging one of said rods and the other having means for engaging the other of said rods, two pairs of levers. the members of each pair being connected together and to the respective rock shafts to cause a back and forth motion of its shaft when the levers of the pair are alternately moved in the same direction, means operated by the foot lever for imparting such movements to said levers, and a selector device to cause the shifting of any of said levers at will from neutral to gear shifting position and the shifting of any one of said levers of either pair from shifted to, neutral position by successive operations of the foot lever.

8. In a motor vehicle having a foot lever and gear shift mechanism, including two gear shift rods, means for reciprocating said rods comprising, in combination, two rock shafts, one having means for engaging one of said rods and the other having means for engaging the other of said rods, two pairs of toothed gear shift rod operating levers the members of each pair being connected together and to the respective rock shafts to cause a back and forth motion of its shaft when the said rod operating levers of the pair are alternately moved, a rocking frame carrying a pawl for engaging the tooth of each of said rod operating levers, means connecting said frame with the foot lever for actuation thereby, a selector device adapted to permit the actuation for gear shifting by the pawl of one only of said rod operating levers upon the operation of the foot lever.

9. In a motor vehicle having a foot lever and a gear shift mechanism including two gear shift rods, means for reciprocating said rods comprising, in combination two rock shafts, one having means for engaging one of said rods and the other having means for engaging the other of said rods. two pairs of toothed gear shift rod operating levers, the members of each pair being connected together and to the respective rock shafts to cause a back and forth motion of its shaft when the levers of the pair are alternately moved. a rocking frame carrying a pawl for engaging the tooth of each of said rod operating levers, means connecting said frame with the foot lever for actuation thereby. a selector device adapted to permit the actuation for gear shifting by the pawl of one only of said rod operating levers upon the operation of the foot lever, said selector device also adapted to cause the restoration of a previously shifted rod operating lever to neutral position by a partial actuation of another of said pawls.

10. In a motor vehicle having a foot lever and a gear shift mechanism including two gear shift rods. means for reciprocating said rods comprising, in combination two rock shafts, one having means for engaging one of said rods and the other having means for engaging the other of said rods. two pairs of toothed gear shift rod operating levers. the members of each pair being connected together and to the respective rock shafts to cause a back and forth motion of its shaft when the levers of a pair are alternately moved, a rocking frame carrying a pawl for engaging the tooth of each of said rod operating levers, means connecting said frame with the foot lever for actuation thereby, bridging means associated with each rod operating lever for preventing the successive actuation of any one of said levers by successive actuation of the foot lever, and a selector device adapted to permit full movement of two of said pawls for gear shifting actuation of first one and then another of such rod operating levers.

11. Means for reciprocating a gear shift rod comprising, in combination, a rock shaft and means for actuating said rod from said shaft. a pair of levers connected together and to said rock shaft to cause a back and forth motion of the shaft when said levers are successively moved in the same direction and means for actuating either of said levers at will and means for automatically causing said levers to be moved out of and into a neutral position by successive actuations of said levers.

12. In means for actuating a gear shift rod, the combination of a rock shaft, means in connection therewith for moving the gear shift rod, a pair of levers, a bell crank member secured to said rock shaft and having one of its arms operably engaged with one of said levers and its other arm linked to the other of said levers to cause a retrograde movement from a neutral position of the other lever when either of said levers is advanced from such a position and means whereby either of said levers may be advanced at will.

13. In means for actuating a gear shift rod, the combination of a rock shaft, means in connection therewith for moving the gear shift rod, a pair of levers, a bell crank member secured to said rock shaft and having one of its arms operably engaged with one of said levers and its other arm linked to the other of said levers to cause a retrograde movement from a neutral position of the other lever when either of said levers is advanced from such a poistion, means whereby either of said levers may be advanced at will and means for automatically causing a restoration of said levers to said neutral position upon a second operation of the said advancing means.

JAMES S. ALSPAUGH.